UNITED STATES PATENT OFFICE.

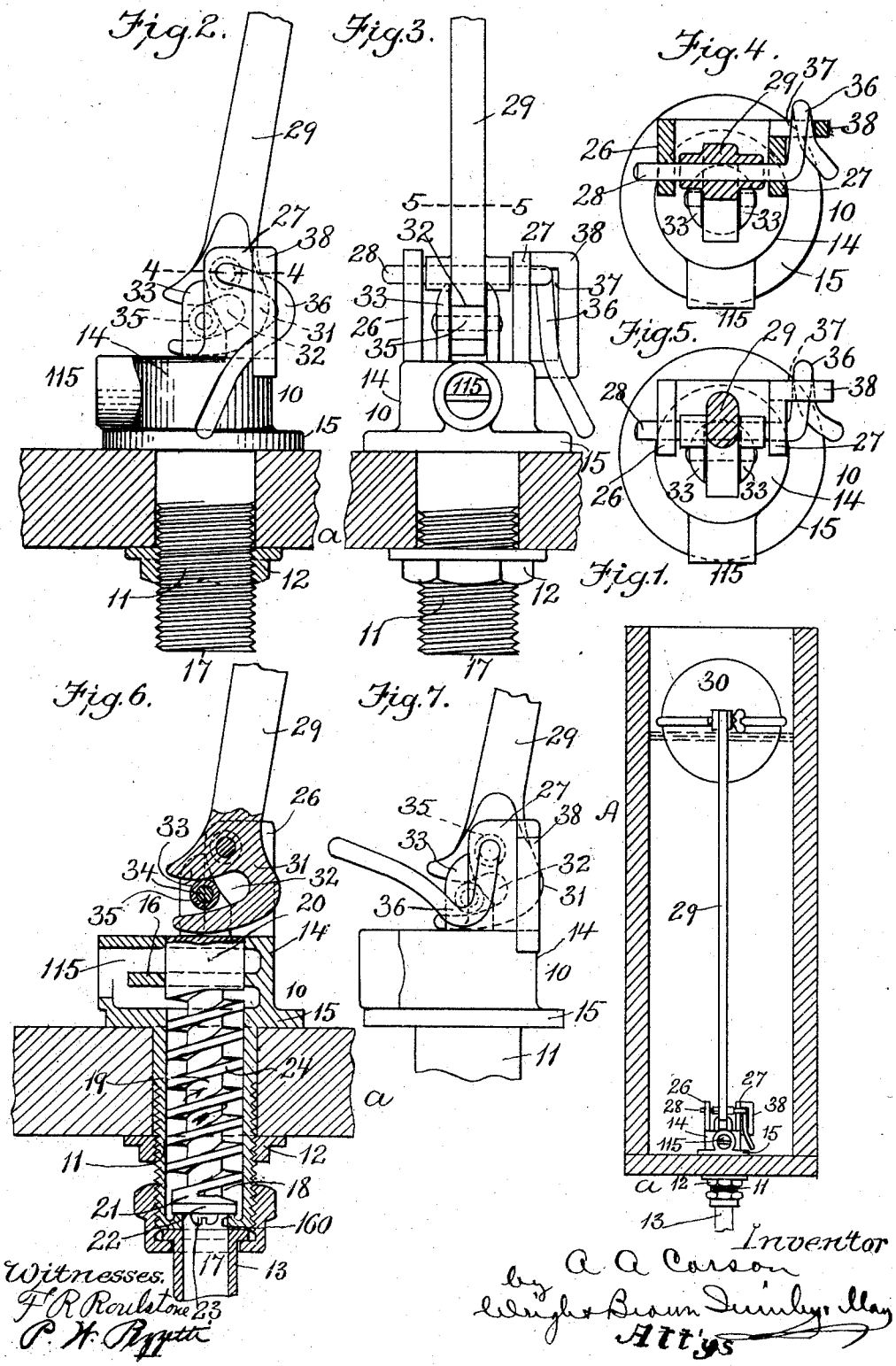

ALEXANDER A. CARSON, OF BRAINTREE, MASSACHUSETTS.

BALL-COCK.

972,331.  Specification of Letters Patent.  Patented Oct. 11, 1910.

Application filed May 28, 1908. Serial No. 435,511.

*To all whom it may concern:*

Be it known that I, ALEXANDER A. CARSON, of Braintree, in the county of Norfolk and State of Massachusetts, have invented certain new and useful Improvements in Ball-Cocks, of which the following is a specification.

It has become the practice in many establishments to use in connection with water-closets what is termed "low down" tanks. Such tanks are narrow receptacles adapted to contain merely a sufficient amount of water to effectively flush the closet, and, where ballcocks are placed in such tanks, they are difficult of access and are hard to repair and keep adjusted and in order.

One of the objects of the present invention is to provide a ballcock of novel construction by which it is more particularly applicable for low down tanks, and which will enable the several parts, including the valve, to be taken apart for adjustment or repair with ease and facility.

Another object of the invention is to provide a ball cock so constructed that there will be no noise or hissing sound and no hammering of the valve when the water is flowing through the cock, or when the valve is approaching its seat.

On the accompanying drawings, I have illustrated a valve embodying my invention.

Referring to said drawings,—Figure 1 represents in section the low down tank equipped with my improved valve. Fig. 2 represents the valve in side elevation. Fig. 3 represents the same in end elevation. Fig. 4 represents a section on the line 4—4 of Fig. 2. Fig. 5 represents a section on the line 5—5 of Fig. 3. Fig. 6 represents a longitudinal vertical section through the valve. Fig. 7 illustrates the fulcrum pin unlocked ready to be removed.

Referring to the drawings, the tank is indicated at A and it is provided with a bottom wall *a* upon which the valve casing is seated. The valve itself comprises a casing 10 and a valve member 18. The casing 10 consists of a tubular or cylindrical portion 11 which is passed through the bottom wall *a* of the tank and which is exteriorly threaded to receive the union or coupling which connects the casing with the supply pipe 13. The valve casing is provided with a head 14 having a flange 15 adapted to be seated on the bottom wall and to be tightly clamped thereagainst by means of the nut 12. The head is provided with a lateral outlet chamber 115 divided by a horizontal partition 16. At the lower end of the tubular portion of the casing there is a valve seat 160 which surrounds the inlet 17. The valve 18 consists of a spindle 19 having at its upper end a head 20 which slides in an aperture in the head 14 of the casing. At its lower end, the spindle 18 has what may be termed the "valve proper", which consists of a flange 21 at the end of the spindle and a washer 22, the latter being secured in place by a screw 23. The face of the washer is adapted to be seated against the valve seat as shown, and the entire valve member may be removed from the casing by drawing it upward longitudinally of its length. For the purpose of guiding the valve and also for the purpose of throttling the passage of the water through the valve casing, the spindle is provided with a helical flange 24 which extends from the head 20 to the flange 21. The cross-sectional area of the passageway around the valve spindle, thus formed by the helical flange, is less than the area of the inlet 17, so that the water is throttled as it passes through the valve and is emitted without any noise from the outlet 115.

The walls of the long passageway provide considerable friction surface by which the flow of the water is retarded, and cause the water in its outward flow to hold the valve away from its seat, whereby the float is partially submerged until the plunger is almost seated, whereupon the pressure is reduced, and the float forces the valve against the seat with a snap. With this construction, the water is compelled to pass through an elongated passageway from the inlet to the outlet which is much longer than a straight line connecting said inlet and outlet.

For the purpose of controlling the valve by a float, the head 14 of the valve casing is provided with two uprights 26 27 which are apertured to receive a fulcrum pin or pintle 28. Fulcrumed upon the pintle is a lever 29, to the end of which is connected the usual float 30. The lever 29 has a shorter arm 31 with a cam-slot 32. Projecting upwardly from the head 20 of the valve are ears 33, through which is passed a pin 34 having upon it a roller 35. This roller lies in the cam-slot 32, and, when the lever 29 moves upwardly by reason of the buoyancy of the float when the water rises in the tank, one wall of the cam-slot forces the roller and valve downwardly so as to cause the valve to be seated to shut off the supply of water. The pintle or pin 28 is provided with a lock to prevent its accidental displacement. This lock consists of a bent elbow 36 on the end of the pin or pintle which may be inserted in a slot 37 formed in a lug 38 projecting laterally from the upright 27, as shown in Figs. 3 and 4. This elbow 36 is more or less resilient, so that, when it is forced into the aperture 37, it engages the wall thereof with a spring pressure so that it is securely held against accidental displacement, either rotatively or axially of the pintle.

By reason of this construction it will be seen that a plumber may insert his hand through the upper portion of the tank and by rotating the pintle 28, free the bent elbow from the locking member 38 and then withdraw it axially after which the float lever and the valve may be easily withdrawn vertically for repair or inspection.

Having thus explained the nature of my said invention and described a way of constructing and using the same, although without attempting to set forth all of the forms in which it may be made or all of the modes of its use, I declare that what I claim is:—

1. In a ballcock for low down tanks, a casing adapted to be inserted through and secured to the wall of a tank, and having a tubular body portion with a seat at its end, and a head with a lateral outlet, a valve removable axially from the tubular portion through an aperture in the said head of said casing, a float lever having means for engagement with said valve, and a pin for detachably pivoting said lever to said casing.

2. In a ballcock for low down tanks, a casing adapted to be inserted through and secured to the bottom wall of the tank, said casing having a projecting downwardly tubular portion formed with a seat at its lower end, and a head with a lateral outlet and an aperture alined with the bore of the tubular portion, and a float-controlled valve, comprising a stem having at its lower end a valve disk for engagement with said seat, at its upper end a head to fit said aperture and means between said head and disk for guiding said valve.

3. In a ballcock, a casing having a cylindrical bore with an inlet at its end encircled by a seat, a valve comprising a stem, a disk at its end to engage the seat and close said inlet and a helical flange on said stem fitting the bore of the casing, said flange forming a helical passageway for the water less in cross-sectional area than the said inlet, and means to slide said valve toward and from the seat without rotating it.

4. In a ball cock, a valve casing having a cylindrical bore, an inlet and an outlet, and a plunger valve having a water passageway for conducting water from the said inlet to the said outlet, said passageway being longer than a straight line connecting said inlet and said outlet.

5. In a ball cock, a valve casing having a cylindrical bore, an inlet and an outlet, and a plunger valve having a passageway for conducting the water from the inlet to the outlet, said passageway being less in cross sectional area than the inlet and being greater in length than the distance between the inlet and the outlet.

6. In a ballcock, a casing comprising a head formed with a lateral flange to engage the wall of a tank, and a tubular externally threaded body portion to project through an aperture in such wall and having at its upper end a lateral outlet and at its lower end an inlet encircled by an internal valve seat, a nut on said threaded body portion to coact with said flange in clamping said casing in place, a valve in said casing and removable from the head thereof, and a float lever having an open slot for engaging said valve.

7. In a ballcock, a valve casing having ears, a valve in said casing, a float lever having an open slot, a pivot pin passed through the ears on said casing, said pivot pin and said casing having coacting locking means for holding said pin against dislocation.

8. In a ballcock, a valve casing having ears, a valve in said casing, a float lever having an open slot, a pivot pin passed through the ears on said casing, said casing having a socket, and said pin having a bent end for engagement with said socket.

9. A ball cock, having, in combination, a valve body provided with an inlet, a plunger space and an outlet, and a plunger in the plunger space normally closing the inlet and provided with a stream deflecting water passage passing substantially around the plunger.

10. A ball cock, having, in combination, a valve body provided with an inlet, a plunger space, and an outlet and a plunger substantially filling the plunger space and normally closing the inlet, the plunger being provided with a stream deflecting portion engaging the stream of water flowing from the inlet to the outlet and formed to retard the longitudinal movement of the stream but to permit it to escape freely and silently in a substantially transverse direction.

In testimony whereof I have affixed my signature, in presence of two witnesses.

ALEXANDER A. CARSON.

Witnesses:
A. L. FOLSOM,
P. W. PEZZETTI.